April 6, 1965 SABURO UEMURA ETAL 3,177,297

BOUNDARY DISPLACEMENT MULTI-CHANNEL MAGNETIC HEAD

Filed June 15, 1960 2 Sheets-Sheet 1

Inventors
Saburo Uemura & Yoshio Sakai
by Hill, Sherman, Meroni, Gross & Simpson Attys.

BOUNDARY DISPLACEMENT MULTI-CHANNEL MAGNETIC HEAD

Filed June 15, 1960 2 Sheets-Sheet 2

Inventors
Saburo Uemura & Yoshio Sakai
by Hill, Sherman, Meroni, Gross & Simpson Attys.

United States Patent Office 3,177,297

Patented Apr. 6, 1965

3,177,297

BOUNDARY DISPLACEMENT MULTI-CHANNEL MAGNETIC HEAD

Saburo Uemura and Yoshio Sakai, both of Tokyo, Japan, assignors to Sony Corporation, Shinagawa-ku, Tokyo, Japan, a corporation of Japan Filed June 15, 1960, Ser. No. 36,194
Claims priority, application Japan, June 16, 1959, 34/19,448, 34/19,451; June 17, 1959, 34/34,707
6 Claims. (Cl. 179—100.2)

This invention relates to a boundary-displacement magnetic multi-head and method of manufacturing the same.

One object of this invention is to provide a boundary-displacement magnetic multi-head which is simple in construction and accurate in operation.

Another object of this invention is to provide a boundary-displacement magnetic multi-head which is easily manufactured and assembled.

A further object of this invention is to provide a boundary-displacement magnetic multi-head in which a permanent magnet can be detachably attached to a D.C. bias magnetic core so as to facilitate replacement of the permanent magnet with a new one.

Other objects, features and advantages will be more fully apparent from the following detailed description taken in connection with the accompanying drawings in which.

Figures 1, 2, 3:
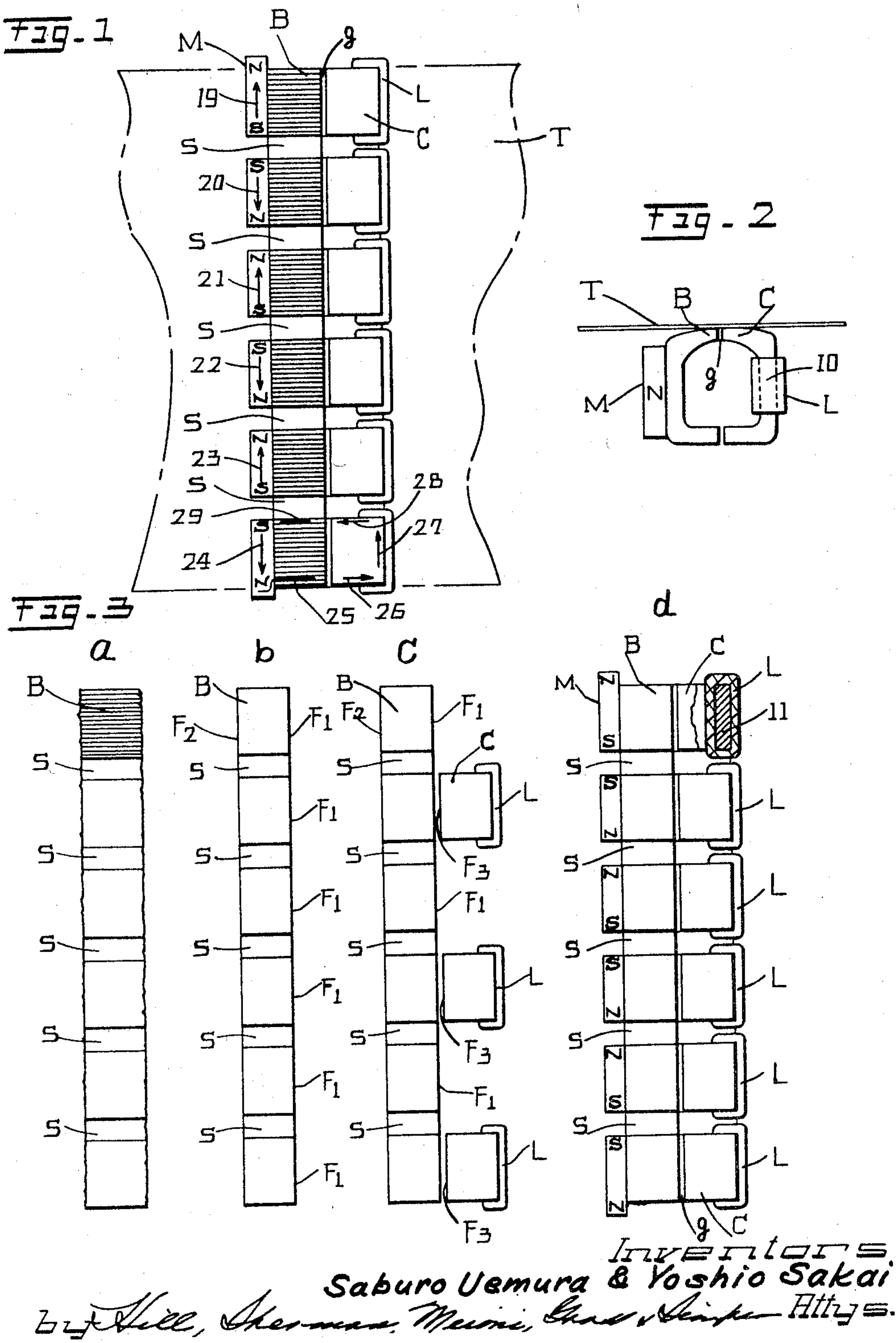
FIGURE 1 is a front view of a boundary-displacement magnetic multi-head according to this invention.
FIGURE 2 is a bottom side view of the multi-head shown in FIGURE 1.
FIGURE 3 is a diagrammatic representation of a process for making a boundary-displacement magnetic multi-head according to this invention.

Referring to the drawings, a boundary-displacement magnetic multi-head according to this invention consists of a plurality of head elements, each having a D.C. bias magnetic core B which gives boundary-displacement conditions to a magnetic tape T, a single magnetic core C which is arranged oppositely to the magnetic core B to form an actuating gap therebetween and a single coil L wound on the magnetic core C. In order to give D.C. bias flux to the D.C. magnetic core B, it is usual to use a permanent magnet M.

The above mentioned boundary-displacement magnetic multi-head is contacted to the magnetic tape T to give a boundary-displacement magnetic recording thereto according to signal currents.

In accordance with this invention, the above mentioned head elements are arranged and assembled to form a multi-channel type head so that many different kinds of signals can be recorded on a magnetic tape simultaneously or individually. That is, a plurality of magnetic head elements as above described are so integrally combined by non-magnetic spacers S that actuating gaps of the head elements are aligned on a straight line.

In this case the D.C. bias magnets M have directions of magnetization as indicated by arrows 19–24, so that the poles of the same polarity are opposite to each other, that is the successive adjacent D.C. magnets are arranged with polarities for example, of NS-SN-NS-SN . . . as shown in FIGURE 1. Each magnetic head element can be operated individually and is isolated from adjacent head elements by the respective non-magnetic spacers S. With the arrangement of magnets M shown in FIGURE 1, the poles of the same polarity of the adjacent D.C. magnets react against each other so that the D.C. bias flux from one head element scarcely flows to the adjacent D.C. bias magnetic path. Thus the adjacent head elements can operate independently. Moreover, each head element has individually a D.C. bias magnet which is detachable and can be changed, if desired. As seen from FIGURE 1, it is preferable to use longer or stronger permanent magnets for the magnetic head elements at the both ends of the multi-head.

With this arrangement the magnetic fields at the outer sides of the both ends of the multi-head are strengthened to substantially the same degree of the magnetic field strength as the inner parts of the multi-head where the magnetic fields are strong owing to the aiding relationship of the adjacent poles of the adjacent magnets, thereby giving substantially the same boundary-displacement condition in connection with every part of the multi-head.

Figure 4:
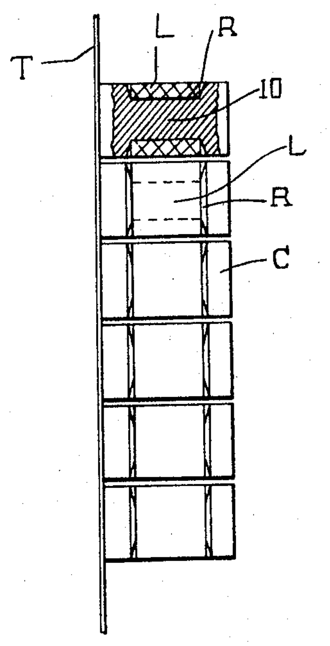
FIGURE 4 is a side view of a modified arrangement of a boundary-displacement magnetic multi-head shown in FIGURE 5.

We will explain the method of manufacturing the above mentioned boundary-displacement magnetic multi-head in connection with FIGURES 3 and 4. First, a plurality of D.C. bias magnetic cores B are arranged and combined with the spacers S which serve to magnetically separate the magnetic cores B, as shown in FIGURE 3–*a*. The combination member can preferably be made by casting with a non-magnetic material such as a synthetic resin which then provides the spacers S and integrally bonds the successive magnetic cores B together as a unit. Next, the gap faces $F_1$ of the D.C. bias magnetic cores B are simultaneously finished in a plane as shown in FIGURE 3–*b*. This can be done by an ordinary finishing operation.

The advantage of the method of making the head according to this invention is that the finishing of the faces of a plurality of magnetic head elements can be done by a single operation.

On the other hand, the gap face $F_3$ of each signal magnetic core C which has the signal coil L and which is to be arranged oppositely to a bias magnetic core B to form the actuating gap *g* therebetween is separately finished. The finished face $F_3$ of each signal magnetic core C is arranged oppositely to the finished face $F_1$ of a corresponding bias magnetic core B to maintain a desired gap *g*, as shown in FIGURE 3–*c*. In this case, the corresponding magnetic cores B and C can be selected as desired. Two pairs of the corresponding magnetic cores B and C are selected in the example shown in FIGURE 3–*c*.

The method of manufacturing the multi-head according to this invention has the advantage of improving the uniformity of the gaps of the multi-head. This uniformity of the gaps results from the fact that the gap-defining surfaces of the bias magnetic cores B are simultaneously finished and are aligned in a plane and the fact that the gap face of each individual signal core C is readily finished to accurately form the desired gap with a core B. To the other faces $F_2$ of the magnetic cores B are attached permanent magnets M as shown in FIGURE 3–*d*.

In some cases, it is preferable that each signal core C be provided with a recess R formed in the edges of the vertical leg 10 extending perpendicular to the plane of the magnetic tape T in FIGURE 4 rather than without the recess R such as indicated in FIGURE 2. The signal coil L is then wound around leg 10 in the recess R, as shown in FIGURE 4. This arrangement makes it possible to shorten the length of the multi-head as compared with that shown in FIGURE 1.

This arrangement can also be made by laminating the signal magnetic cores C and casting with synthetic resin, thereby facilitating mass production of such multi-heads.

Non-laminated cores C are shown as cast with synthetic resin in FIGURES 1, 3*d* and 4.

It is needed to adjust the magnetic strength and shape of the permanent magnets M according to the magnetic recording. Therefore, it is desired to divide the permanent magnet M into a plurality of pieces as indicated at 13 and 14 in FIGURE 6 and to be able to adjust the magnetic force. It is also desired to detachably secure the permanent magnets M to the D.C. bias magnetic cores B so that the permanent magnets can be removed if their strength should change for some reason while in service.

Figure 5:
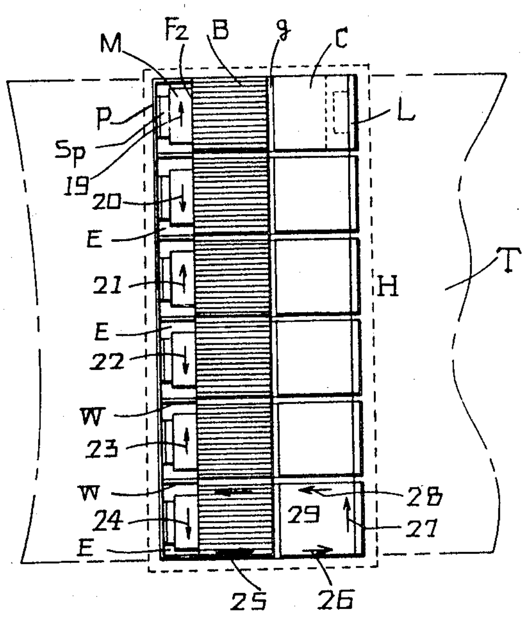
FIGURE 5 is a front view of an assembled boundary-displacement magnetic multi-head according to this invention.

This invention also intends to provide a boundary-displacement magnetic multi-head which satisfies the above demand. For this purpose, we provide a container P of a non-magnetic material which is separated by walls W into several sections corresponding to the respective D.C. bias magnetic cores B. Into the sections are detachably inserted permanent magnets such as indicated at 13 and 14 and having directions of magnetization as indicated by arrows 15 and 16 which are to be attached to a respective D.C. bias magnetic core B. With the magnets such as 13 and 14 in place, the respective directions of magnetization such as shown by arrows 15 and 16 coincide with the directions of magnetization of magnets M as indicated by arrows 19–24 in FIGURE 5. The effective flux path in each head element is then as indicated by arrows 25–29 in FIGURES 1 and 5.

Figure 6:
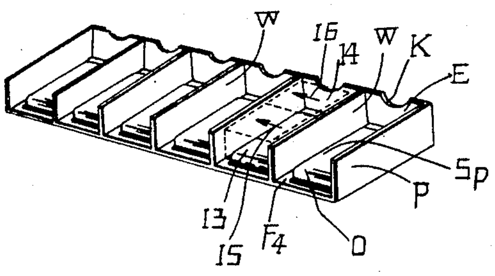
FIGURE 6 is a perspective view of a frame in which the permanent magnets of FIGURE 5 are assembled and attached.

When the container P which contains the permanent magnets M is placed against the core B, the permanent magnets with their own magnetic force, adhere to the core B, but in order to ensure the contacts more firmly, as shown in FIGURE 6, it is desired that the bottom $F_4$ of each section is provided with a leaf spring $S_p$ which serves further to press the permanent magnets 13 and 14 securely against the face $F_2$ of the D.C. bias magnetic core B, when the entire multi-head is assembled on a non-magnetic supporting body (not shown).

It is preferable to form a supporting plate E at the back side of the container. The other side can be dispended with to form an opening O to pass the permanent magnets. In the example shown in the drawing, each section of the container P has a front opening O to pass the permanent magnets and a back plate E which is provided with an aperture K through which a finger is passed to push the permanent magnets to remove the same from the front opening O.

The arrangement above explained has the advantage that the permanent magnets can be removed from the respective sections of the container by pushing the same, while the position and conditions of the head elements remain unchanged. This facilitates adjustment of the permanent magnets as desired and accordingly head elements having substantially the same characteristics can be provided for each channel of the multiple head assembly.

While we have explained a particular embodiment of our invention, it will be understood, of course, that we do not wish to be limited thereto since many modifications may be made and we therefore contemplate by the appended claims to cover any such modifications as fall within the spirit and scope of our invention.

What is claimed is:

1. A boundary-displacement magnetic multi-head comprising magnetic head elements, each having a D.C. bias magnetic core which gives boundary-displacement conditions to a magnetic medium, a permanent magnet attached to said D.C. bias magnetic core, a signal magnetic core which is arranged oppositely to said D.C. bias magnetic core to form an actuating gap therebetween, and a signal coil wound on said signal magnetic core, said magnetic head elements being so integrally combined that the actuating gaps of said magnetic head elements are aligned on a straight line and that the poles of the same polarity of said permanent magnets are opposite to each other, said permanent magnets for said magnetic head elements at the ends of said multi-head being stronger than those arranged at the middle part of said multi-head.

2. A boundary-displacement multi-head comprising magnetic head elements, each having a D.C. bias magnetic core which gives boundary-displacement conditions to a magnetic medium, a permanent magnet attached to said D.C. bias magnetic core, a signal magnetic core which is arranged oppositely to said D.C. magnetic core to form an actuating gap therebetween, a signal coil wound on said signal magnetic core, and a container of a non-magnetic material having sections each corresponding to one of the respective D.C. bias magnetic cores, said containers having means in each section thereof of detachably engaging one of the permanent magnets for retaining the permanent magnets of the magnetic head elements in assembled relation to said D.C. magnetic cores.

3. A boundary-displacement multi-head comprising magnetic head elements, each having a D.C. bias magnetic core which gives boundary-displacement conditions to a magnetic medium, a magnet for coupling to said D.C. bias magnetic core, a signal magnetic core which is arranged oppositely to said D.C. magnetic core to form an actuating gap therebetween, a signal coil wound on said signal magnetic core, and a container of a non-magnetic material having sections each corresponding to one of the respective D.C. bias magnetic cores and receiving one of the magnets, said sections each having a leaf spring detachably engaging the associated magnet and pressing said magnet against a face of said D.C. bias magnetic core, and said container haivng an opening at each section thereof to accommodate removal of said magnet from said section and having an aperture opposite said opening through which a member can pass to push said magnet out of said section.

4. A boundary-displacement multi-channel magnetic head comprising a series of magnetic head elements each having a first magnetic core having first pole means for energization to produce a bias field for boundary-displacement magnetic recording, a second magnetic core having second pole means arranged oppositely to the first pole means of said first magnetic core to form a non-magnetic gap therebetween for coupling to a magnetic record medium travelling successively across said pole means of the respective cores, a magnet coupled to each head element for energizing said first pole means to produce said bias field for boundary-displacement magnetic recording, and means coupled to each head element for modifying said bias field at said gap in accordance with a signal to be recorded, the first pole means of said series of head elements being arranged in a line transversely to the path of the record medium thereacross and having respective polar faces forming parts of a common planar surface, and non-magnetic spacer means between successive ones of said first pole means and having planar faces flush with and defining part of said common surface, said common surface being of solid material over the entire area thereof and being entirely smooth and continuous with all portions of said surface being integrally connected and smoothly merged with each other.

5. A boundary-displacement multi-channel magnetic head comprising a series of magnetic head elements each having a first magnetic core having first pole means, and a second magnetic core having second pole means arranged oppositely to the first pole means of said first magnetic core to form a non-magnetic gap therebetween for coupling to a channel of a magnetic record medium travelling successively across said pole means of the respective cores, the first pole means of the respective head elements being arranged in a line transversely to the path of the record medium thereacross and having respective polar faces forming parts of a common plane, the first magnetic cores of said head elements having magnet receiving faces directed oppositely to the polar faces and lying in a common plane, a series of permanent magnets each engaging one of the magnet receiving faces and magnetized to produce a bias field at said gap for boundary-displacement magnetic recording, means coupled to each head element for modifying said bias field at said gap in accordance with a signal to be recorded, non-magnetic means securing the first magnetic cores in assembled relation, and a container for the permanent magnets of the successive head elements comprising a wall extending parallel to the magnet receiving faces of said first magnetic cores and having spring means interposed between said wall and the respective magnets for pressing said permanent magnets against the respective magnet receiving faces of the first magnetic cores, said container having openings laterally of said wall and aligned with the respective permanent magnets to enable removal of said permanent magnets from the container without removal of said container from its assembled relation to said head elements.

6. A boundary-displacement multi-channel magnetic head comprising a series of magnetic head elements each having a first magnetic core having first pole means for energization to produce a bias field for boundary-displacement magnetic recording, a second magnetic core having second pole means arranged oppositely to the first pole means of said first magnetic core to form a non-magnetic gap therebetween for coupling to a magnetic record medium traveling successively across said pole means of the respective cores, a magnet coupled to each head element for energizing said first pole means to produce said bias field for boundary-displacement magnetic recording, and means coupled to each head element for modifying said bias field at said gap in accordance with a signal to be recorded, the first pole means of said series of head elements being arranged in a line transversely to the path of the record medium thereacross and having respective polar faces forming parts of a common planar surface, and non-magnetic spacer means between successive ones of said first pole means and having planar faces flush with and defining part of said common surface, said common surface being of solid material over the entire area thereof and being entirely smooth and continuous with all portions of said surface being integrally connected and smoothly merged with each other, said spacer means being of non-magnetic casting material bonded to the successive first magnetic cores to secure the successive first magnetic cores together as a rigid unit, and the casting material being bonded to the first magnetic cores directly adjacent said first pole means thereof to rigidly position the pole means of the respective first magnetic cores.

References Cited by the Examiner

UNITED STATES PATENTS

| | | | |
|---|---|---|---|
| 1,575,696 | 3/26 | La Salle | 206—73 |
| 2,674,031 | 4/54 | Buhrendorf | 29—155.57 |
| 2,674,659 | 4/54 | Buhrendorf | 179—100.2 |
| 2,676,392 | 4/54 | Buhrendorf | 29—155.58 |
| 2,677,091 | 4/54 | Buhrendorf | 179—100.2 |
| 2,743,320 | 4/56 | Daniels et al. | 179—100.2 |
| 3,087,026 | 4/63 | Daniels | 179—100.2 |

FOREIGN PATENTS

| | | |
|---|---|---|
| 382,490 | 10/32 | Great Britain. |
| 794,976 | 5/58 | Great Britain. |
| 1,059,198 | 6/59 | Germany. |

IRVING L. SRAGOW, *Primary Examiner.*

NEWTON N. LOVEWELL, BERNARD KONICK, WALTER W. BURNS, JR., *Examiners.*